No. 630,644. Patented Aug. 8, 1899.
H. BATE.
TIME REGULATOR FOR PHOTOGRAPHIC SHUTTERS.
(Application filed Aug. 29, 1898.)
(No Model.) 3 Sheets—Sheet 1.
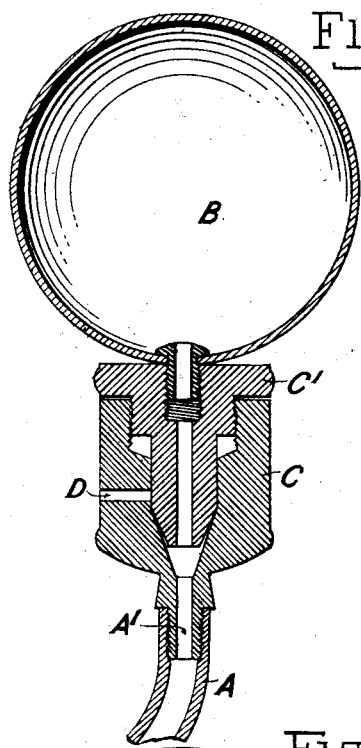
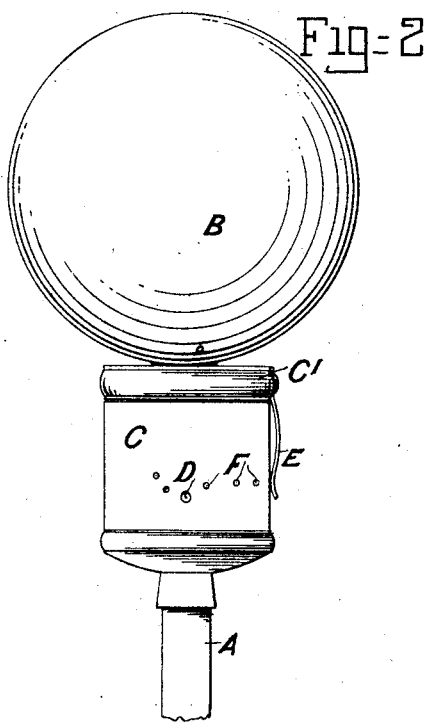
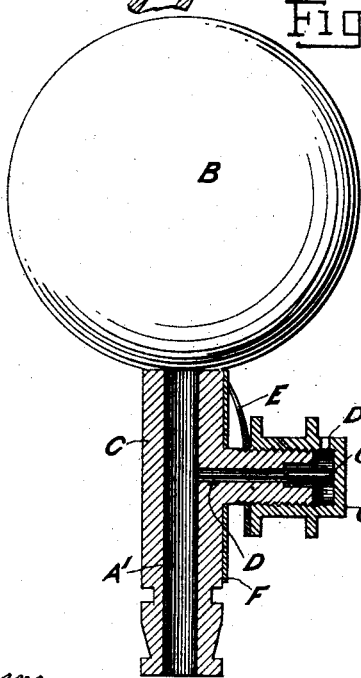
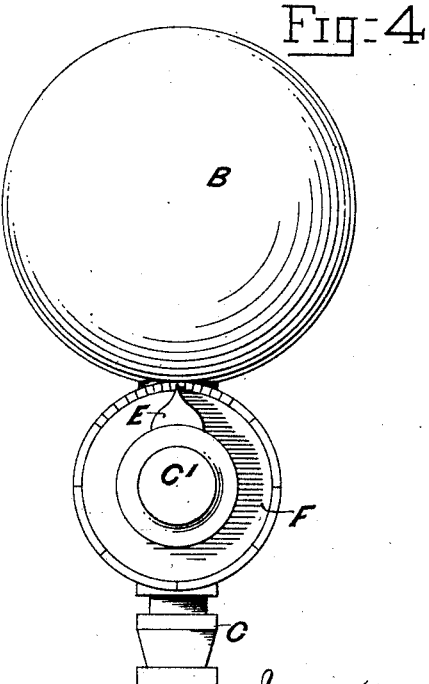
Witnesses
Chas. H. Smith
Geo. T. Pinckney
Inventor
Henry Bate
per L. W. Serrell & Son
attys
THE NORRIS PETERS CO., PHOTO-LITHO., WASHINGTON, D. C.

No. 630,644. Patented Aug. 8, 1899.
H. BATE.
TIME REGULATOR FOR PHOTOGRAPHIC SHUTTERS.
(Application filed Aug. 29, 1898.)
(No Model.) 3 Sheets—Sheet 2.
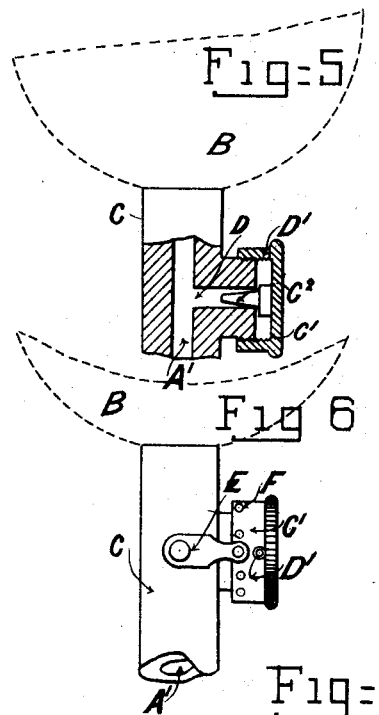
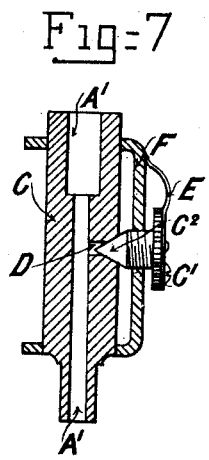
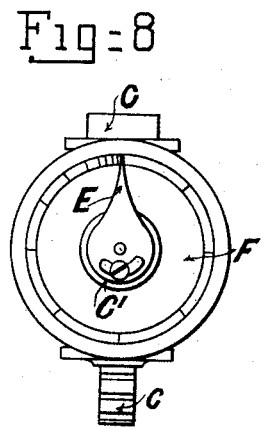
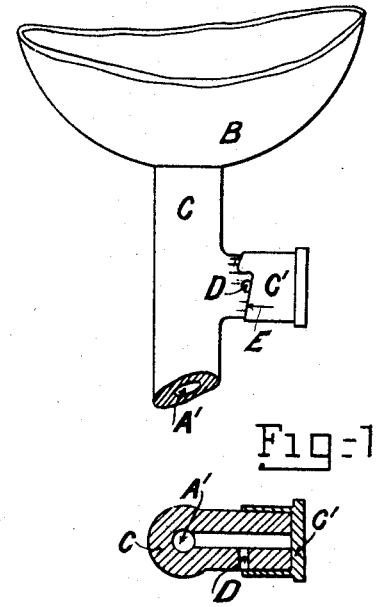
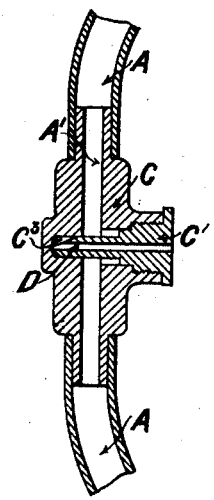
Witnesses
Chas. H. Smith
Geo. T. Pinckney
Inventor
Henry Bate
per L. W. Serrell & Son
att'ys
THE NORRIS PETERS CO., PHOTO-LITHO., WASHINGTON, D. C.

No. 630,644. Patented Aug. 8, 1899.
H. BATE.
TIME REGULATOR FOR PHOTOGRAPHIC SHUTTERS.
(Application filed Aug. 29, 1898.)
(No Model.) 3 Sheets—Sheet 3.
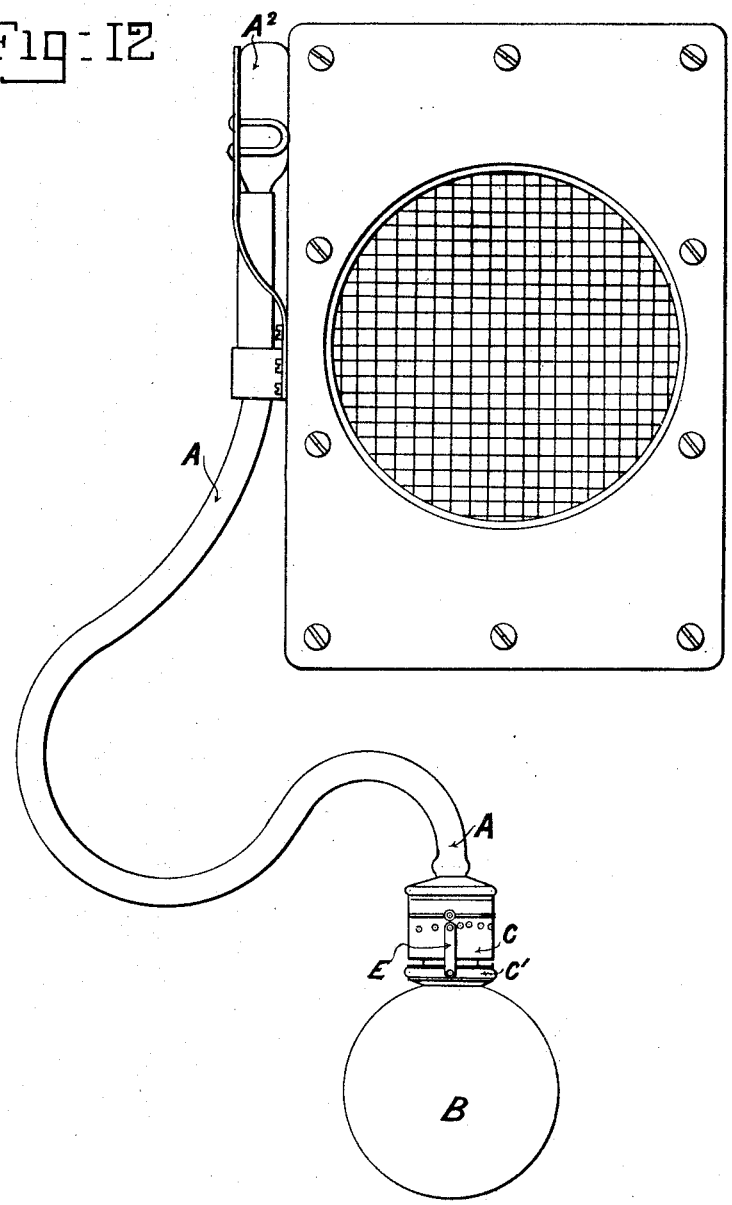

UNITED STATES PATENT OFFICE.

HENRY BATE, OF WOLVERHAMPTON, ENGLAND.

TIME-REGULATOR FOR PHOTOGRAPHIC SHUTTERS.

SPECIFICATION forming part of Letters Patent No. 630,644, dated August 8, 1899.

Application filed August 29, 1898. Serial No. 689,748. (No model.)

*To all whom it may concern:*

Be it known that I, HENRY BATE, a subject of the Queen of Great Britain, residing at Wolverhampton, county of Stafford, England, have invented a new and useful Time-Regulating Device for Pneumatically-Controlled Photographic Shutters, (for which I have made application for patent in Great Britain, dated March 28, 1898, No. 7,454,) of which the following is a specification.

Photographic shutters are commonly provided with pneumatically-operated mechanism whereby they are caused to open and close. In many pneumatically-operated shutters as now commonly made an elastic ball containing air is connected with a tube which communicates with an expansible cushion or equivalent, the office of the cushion being to operate by its expansion or contraction a spring-lever, which latter controls the movement of a shutter, the said shutter deriving motive power from suitable means—such, for example, as springs. The action of such arrangements is usually as follows: When the elastic ball is compressed, the cushion is expanded and the lever is moved away from its normal position. When the lever is in this position, the shutter has been released and allowed to open and is retained open until the lever has returned to its normal position, whereupon the shutter is freed and closes. The lever returns to its normal position when the air from the expansible cushion has returned to the ball or escaped.

The object of my invention is to provide an adjustable time-regulating means or device which can be readily fitted or applied to existing pneumatically-acting photographic shutters, such as above described, without interfering in any way with the construction of the shutter itself or with its operating mechanism and whereby the exposure to be given by such shutter can be definitely regulated and limited to some predetermined period of time and so that after the lapse of that period the shutter will automatically close. With this object in view and according to my invention I fit between the air-pressure ball and the flexible tube communicating with the expansible cushion or at some point in the length of the tube a regulating device which forms part of the air-passage from the ball to the shutter mechanism, the said device consisting of two parts, one capable of being moved with a rotary motion relatively to the other. An air-escape aperture is formed in one part of the device, which aperture is gradually closed or opened by relative movement of the other part. A scale is provided upon one part and an index upon the other part, by which the said two parts can be relatively set in a desired position to cause air-pressure to be reduced and the shutter closed after the lapse of a predetermined time, and mechanical means are provided to temporarily hold the two parts in the same relative position when so set. By this arrangement I am able to apply my automatically-acting time-closing device to any pneumatically-acting shutters, such as above described, without in any way interfering with the existing arrangement of the said shutters.

I will now describe several constructions of time-regulating devices constructed according to my invention and their application to pneumatically-acting shutters.

Figures 1 and 2 are respectively sectional and side elevations of a time-regulating device drawn to a large scale for the sake of clearness. Figs. 3 and 4, 5 and 6, and 7 and 8 are respectively similar views of Figs. 1 and 2 of devices differing in construction and arrangement. Figs. 9 and 10 are respectively side elevation and cross-section of a modification. Fig. 11 shows another modification, and Fig. 12 illustrates the application of my invention to a photographic shutter.

Referring generally to the figures of the drawings, A is the flexible tube, to the end of which the air-pressure ball B is usually attached, and my time-regulating device, composed of the two relatively movable parts C C', is shown as fitted between the ball B and the tube A or intermediately in the length of the tube itself. The air-passage from the ball to the shutter mechanism passes through the device, and the part C of the latter has the air-escape aperture D formed therein, which aperture can be opened or closed by rotary movement of the part C'.

E is the index, carried by one part, generally the part C', and F is the scale, carried by or formed on the other part C. Means are provided, as before stated, to temporarily hold the one part C in position relatively to the other part C', as hereinafter described. Upon pressure being applied to the pressure-ball B the air is pressed up the tube A, as usual, and passes through the said tubular piece C, thence to the expansible-cushion—such as is, for example, shown at $A^2$, Fig. 12, or its equivalent.

Referring particularly to the construction at Figs. 1 and 2, the device is composed of two parts—viz., the exterior part C, to which the flexible tube A is connected, and the interior part C', connected to the pressure-ball B. The part C has formed therein an air-escape hole D, which forms a passage between the interior of the tubular piece C and the outer air. The end of the part C' fits interiorly the surrounding cylindrical part of C. The upper end of the part C' is screw-threaded and screws into the part C. Upon screwing the part C' into or out of the part C the end of the part C' is brought over or removed from the aperture D, thereby closing or opening or partially closing or opening the passage D, which latter is in communication with the central air channel or passage A'. Secured exteriorly to the part C' is a spring index-finger E, which is arranged so as to bear upon the periphery of the part C, and the finger E passes over a scale F, indicating the time which the air after having been compressed from the pressure-ball B into the cushion $A^2$ takes to escape back through the escape-hole D, or, in other words, indicates the time of exposure. The scale F upon the periphery of the part C forms a helical path corresponding in pitch to the pitch of the screw-thread upon the upper end of the part C', the indicating-marks F being in the form of indentations, into which a projection on the end of the index-finger E takes and tends to temporarily hold the two parts C C' in the same relative position after having once been set.

In Figs. 3 and 4, 5 and 6, 7 and 8, and 9 and 10 the tubular part C is so formed in one piece that the pressure-ball B is connected to one end and the flexible tube A at the opposite end.

Referring particularly to Figs. 3 and 4, a projection is formed upon the part C, having a central air-escape aperture or channel D, communicating with the air-passage A'. The air-escape aperture through the projection on the part C is bored out to have a shoulder upon which bears the shoulder of a rod $C^2$, formed with the part C'. The part C' is screwed internally and screws upon the tubular projection of the part C, whereby the distance between the shoulder in the aperture D and the shoulder on the part $C^2$ can be regulated, and the size of the air-escape aperture is thus controlled. An air-escape aperture D' is formed in the top of the part C'. A disk F is fitted to the part C and an index-finger E connected to the part C', the latter finger E bearing upon the disk F and passing over a scale cut upon the disk indicating the time of exposure.

At Figs. 5 and 6 a conical pin $C^2$ on the part C' takes into the parallel channel D, the part C' and pin $C^2$ being made in one piece, an aperture D' being formed in the head of the part C'. An index-finger E is secured to the part C, and a scale F is cut upon the part C' to indicate the time of exposure, the index E in all cases throughout the figures forming a means to locate the two parts in that relative position which it is required they should be caused to assume according to the time of exposure required.

The construction illustrated at Figs. 7 and 8 consists of the employment of a conical pin $C^2$, taking into the conical end of the channel D, a disk F being employed upon which a scale is cut over which the index-finger E, secured to the part C', passes when adjusting the aperture by which the air escapes.

At Figs. 9 and 10 the tubular projection on the part C is formed with a plain periphery, an air-escape hole D being formed laterally therein. The exit of the hole D is controlled by the part C', the edges of the part C' being cut helically, so that upon turning the part C' the hole D will be partially or wholly open, according to the position the part C' is turned to. A scale indicating the length of exposure may be cut upon the part C' and an index cut upon the periphery of the projection of the part C. In this instance the friction between the parts C' and the projection of part C upon which it fits forms the means by which parts are maintained in relative position when set.

At Fig. 11 is illustrated an arrangement adapted to be located between two tubes, one from the pressure-ball B and one from the expansible cushion $A^2$, Fig. 12, or its equivalent. In this construction the plug of the part C' is of tubular formation, the end fitting into a hollow cylindrical recess bored out in the part C, and a slot $C^3$, as indicated, is cut out in the end of the plug of the part C'. By screwing the plug of part C' into or out of the part C the air-escape hole formed by the slot $C^3$ decreases or increases accordingly. The air from the central channel A' escapes by way of the said slot and thence through the aperture D in the center of the plug of part C' to the open air.

In operation upon pressing the ball B air is forced through the channel A' and tube A into the expansible cushion $A^2$ or equivalent, Fig. 12. The ball B is held by the operator in its compressed state until the air in the cushion $A^2$ has escaped to such an extent, by way of the air-escape hole, that the cushion has assumed its normal condition.

I claim as my invention—

1. In pneumatically-controlled photographic shutters, which open by air being compressed within an elastic ball, and close when pressure ceases, a time-regulating device located between the elastic air-ball and the shutter mechanism, and in communication with the tube forming the air-passage from the ball to the shutter mechanism, the said device being composed of two parts, one capable of being moved with a rotary motion relatively to the other to control the air-escape opening, and divisions upon one part, and an index upon the other part by which the parts can be set in the desired position to cause the air-pressure to be reduced and the shutter to close after the lapse of a predetermined time, and means for holding the two parts in their relative positions when set, substantially as set forth.

2. In pneumatically-controlled photographic shutters, a time-regulating device located between the elastic air-ball and the shutter mechanism, such device consisting of a tubular part located on the air-passage, a cylindrical projection on the said tubular part, having a passage communicating with the main passage and an air-escape aperture in the wall of the cylindrical projection, a second part fitting stiffly onto the cylindrical end of the lateral projection and capable of being turned thereon, and having a cam-formed edge, which edge in one position covers the air-escape aperture, and upon rotation of the second part, the air-escape aperture is gradually uncovered, an index-mark on one part, and a scale on the other part whereby the relatively movable parts may be set as required, and are held in position by friction, substantially as set forth.

HENRY BATE.

Witnesses:
W. A. MARSHALL,
F. W. ROGERS.